(12) United States Patent
Wolpert et al.

(10) Patent No.: US 7,433,026 B2
(45) Date of Patent: Oct. 7, 2008

(54) MICROSCOPE WITH LED ILLUMINATION SOURCE

(75) Inventors: Scott Wolpert, Westford, MA (US); David Zahniser, Wellesley, MA (US)

(73) Assignee: Cytyc Corporation, Marlborough, MA (US)

(*) Notice: Subject to any disclaimer, the term of this patent is extended or adjusted under 35 U.S.C. 154(b) by 283 days.

(21) Appl. No.: 11/313,365

(22) Filed: Dec. 20, 2005

(65) Prior Publication Data

US 2007/0139638 A1 Jun. 21, 2007

(51) Int. Cl.
*G01N 33/48* (2006.01)
(52) U.S. Cl. ..................................................... 356/39
(58) Field of Classification Search ................. 356/39
See application file for complete search history.

(56) References Cited

U.S. PATENT DOCUMENTS

| | | | |
|---|---|---|---|
| 6,150,774 A | 11/2000 | Mueller et al. | |
| 6,193,401 B1* | 2/2001 | Girkin et al. ............... | 362/551 |
| 6,683,419 B2* | 1/2004 | Kriparos ..................... | 315/224 |
| 7,273,298 B2* | 9/2007 | Laschke et al. ............ | 362/234 |
| 7,308,296 B2* | 12/2007 | Lys et al. ................... | 600/407 |
| 2004/0190132 A1* | 9/2004 | Laschke et al. ............ | 359/385 |
| 2004/0263960 A1 | 12/2004 | Obuchi | |

FOREIGN PATENT DOCUMENTS

| | | |
|---|---|---|
| DE | 3734691 A1 | 4/1988 |
| EP | 1150154 A1 | 10/2001 |
| WO | WO 03021329 A2 | 3/2003 |

OTHER PUBLICATIONS

International Search Report for PCT/US2006/061972, forms PCT/ISA/220 and 210, Applicant: Cytyc Corporation, mailed Dec. 6, 2007 (6 pages).
Written Opinion of the International Searching Authority for PCT/US2006/061972, Form PCT/ISA/237, Applicant: Cytyc Corporation, mailed Dec. 6, 2007, (7 pages).

* cited by examiner

*Primary Examiner*—Roy M Punnoose
(74) *Attorney, Agent, or Firm*—Vista IP Law Group LLP

(57) ABSTRACT

Techniques are provided for illuminating cytological specimens using light emitting diodes (LEDs). In one implementation, a pulse width modulated (PWM) LED source allows for color and intensity adjustment. A user may select the desired color and intensity of light, or the desired color and intensity may be electronically calculated. Using various colors of LEDs, such as red, blue, and green LEDs, various colors can be produced by modulating each LED duty cycle, for example, using a PWM controller.

45 Claims, 5 Drawing Sheets

MICROSCOPE WITH LED ILLUMINATION SOURCE

FIELD OF THE INVENTION

The present invention relates to microscope imaging systems, and more particularly, to systems for displaying magnified images of stained specimens.

BACKGROUND

Cytology is the branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "Pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a tissue specimen is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body fluids from the chest cavity, bladder, spinal canal, or other appropriate area. The cell samples are often placed in solution and subsequently collected and transferred to a glass slide for viewing under magnification. Fixative and staining solutions are typically applied to the cells on the glass slide, often called a cell smear, for facilitating examination and for preserving the specimen for archival purposes.

A traditional multicolored stain is desirable for staining cell smears for certain cytological analyses. It is advantageous to stain the nucleus and the cytoplasm of the specimen with different colors, so that the nuclear material and cytoplasmic material can be readily distinguished either visually or by automated imaging equipment. In one staining practice, the cytoplasm is transparent, whereas the nucleus is transparent to opaque. This staining pattern allows the cytologist to distinguish cells which are morphologically abnormal indicated, for example, by nuclear material which is excessively large and/or dark in color. In addition, cytologists find the variety of colors of the traditional stains, particularly the Papanicolaou stain, helpful to reduce eye strain and to aid diagnosis.

Traditional stains, including the Papanicolaou stain, are difficult for an automated system to analyze. The variety of colors in the cytoplasm from traditional stains, which are straightforward for the human eye to distinguish, are not readily analyzed with automated imaging systems because they contrast to varying degrees with the traditional blue hematoxylin stain of the nucleus. The varying contrast makes automated analysis difficult.

During the approximately seventy years since its introduction, the original Papanicolaou stain has undergone many modifications. Currently, the dyes, reagents, and methodology vary widely based on the preferences of each laboratory. While standardization of a Papanicolaou-like stain has been proposed for many years, there has been little incentive for laboratories to do so. This variability affects current imaging technologies which may reject numerous slides either because of problems inherent with a conventional Pap smear preparation, or because of poor staining that produces nuclear-cytoplasmic contrast that is inadequate for image acquisition and analysis.

A number of researchers have developed algorithms in an attempt to attain automated analysis of cells stained with the multicolored Papanicolaou stain. Such techniques involve the use of various instrumental artifacts, such as different colors of light, filters, and color television cameras. Many require a high level of sophistication that is costly in terms of hardware and software.

Furthermore, the type of stain chosen may depend on the type of cells under examination, as well as the specific abnormality or disease to be diagnosed. For this reason, various stains may be used in various laboratory settings.

Conventional machine vision illumination sources are low efficiency broadband sources such as tungsten-halogen, sodium-halide, or xenon lamps. These sources convert a small percentage of their input energy to broadband light. Accordingly, efficiency drops significantly in a cytological application that requires a narrow band light source. Typically, these devices generate a significant amount of heat, require filters for obtaining correct wavelengths, and are relatively large.

There, thus remains a need for an improved light source for illuminating a biological specimen carried by a microscope.

SUMMARY

Accordingly, there is a need in the art for an improved illumination source. The improved illumination source allows for color balancing and intensity adjustment. Because the color and intensity of the light can be tailored to conditions of the system, such as the type(s) of stains used, the type of cells in the sample, and the type of abnormalities/diseases to be detected, diagnosis by a human cytologist or an imaging system may be facilitated.

In accordance with one aspect of the present inventions, a method for viewing a biological specimen is described. The method comprises illuminating the biological specimen with a light source having light emitting diodes (LEDs) arranged in a plurality of unique color groupings, and generating a magnified image of the illuminated biological specimen. To miniaturize the light source, the LEDs may comprise LED dies disposed on a single substrate to form a compact LED module. The method further comprises selecting a desired characteristic of light emitted by the light source, e.g., a color balance or a light intensity. The desired light characteristic may be, e.g., selected in response to a manual input or automated input. Selection of desired light characteristic may be based on a viewing condition, e.g., a type of stain used on a biological specimen. For example, the light characteristic can be customized to discern differently stained parts of the biological specimen.

The method further comprises generating a plurality of drive signals, each of which has a characteristic based on the selected light characteristic. For example, the drive signal characteristic may be an amplitude or a pulse width. The method further comprises supplying the plurality of LED color groupings with the respective plurality of drive signals, wherein light intensities of the LED color groupings are independently controlled to effect the desired light characteristic. In one method, desired light intensities of the LED color groupings are computed based on the selected light characteristic, so that the characteristics of the drive signals can be determined.

In accordance with a second aspect of the present inventions, a system for viewing a biological specimen is provided. The system comprises a microscope configured for generating a magnified image of the biological specimen, and a light source configured for illuminating the biological specimen. The light source has LEDs arranged in a plurality of unique color groupings, e.g., red, blue, and green. Again, to miniaturize the light source, the LEDs may comprise LED dies disposed on a single substrate to form a compact LED module. The system further comprises an input device configured for receiving information to effect a desired characteristic of light emitted by the light source, e.g., a color balance or a light intensity. The input device may, e.g., be a user input device configured for selecting the desired light characteristic. The system may optionally comprise a processor configured for computing the desired light characteristic, e.g., based on a viewing condition, such as a type of stain used on the biological specimen.

The system further comprises control circuitry configured for supplying the plurality of LED color groupings with a respective plurality of drive signals, each of which has a characteristic (e.g., amplitude or pulse width) based on the information received by the input device, wherein light intensities of the LED color groupings are independently controlled to effect the desired light characteristic. If the characteristic of the drive signal is a pulse width, the control circuitry may optionally comprise a pulse width modulation controller configured for generating pulse width modulated control signals, and drive circuitry configured for supplying pulse width modulated drive signals to the respective plurality of LED color groupings in response to the control signals.

In accordance with a third aspect of the present inventions, a method for viewing a biological specimen. The method comprises illuminating the biological specimen with a light source having LEDs, and generating a magnified image of the illuminated biological specimen. The LEDs may optionally be arranged in a plurality of unique color groupings. Again, to miniaturize the light source, the LEDs may comprise LED dies disposed on a single substrate to form a compact LED module. The method further comprises dynamically selecting a desired characteristic of light emitted by the light source, e.g., a color balance or a light intensity. The desired light characteristic may be, e.g., selected in response to a manual input or automated input. Selection of desired light characteristic may be based on a viewing condition, e.g., a type of stain used on biological specimen. For example, the light characteristic can be customized to discern differently stained parts of the biological specimen.

The method further comprises generating one or more pulse width modulated drive signals, each of which has a pulse width based on the desired light characteristic, and supplying the plurality of LEDs with the one or more pulse width modulated drive signals, wherein light intensities of the LEDs are controlled to effect the desired light characteristic. In one method, the one or more pulse width modulated drive signals comprises a plurality of pulse width modulated drive signals that are respectively supplied to the plurality of LEDs, so that the light intensities of the LEDs can be independently controlled to effect the desired light characteristic. If the LEDs are arranged into a plurality of unique color groupings, the plurality of pulse width modulated drive signals can be respectively supplied to the plurality of LED color groupings, so that the light intensities of the LED color groupings can be independently controlled to effect the desired light characteristic. In one method, the pulse width for each pulse width modulated signal is computed based on the selected light characteristic.

In accordance with a fourth aspect of the present inventions, a system for viewing a biological specimen is provided. The system comprises a microscope configured for generating a magnified image of the biological specimen, and a light source configured for illuminating the biological specimen. The light source has LEDs arranged in a plurality of unique color groupings, e.g., red, blue, and green. Again, to miniaturize the light source, the LEDs may comprise LED dies disposed on a single substrate to form a compact LED module. The system further comprises an input device configured for dynamically receiving information to effect a desired characteristic of light emitted by the light source, e.g., a color balance or a light intensity. The input device may, e.g., be a user input device configured for selecting the desired light characteristic. The system may optionally comprise a processor configured for computing the desired light characteristic, e.g., based on a viewing condition, such as a type of stain used on the biological specimen.

The system further comprises control circuitry configured for supplying the plurality of LEDs with one or more drive signals, each of which has a characteristic (e.g., amplitude or pulse width) based on the information received by the input device, wherein light intensities of the LEDs are controlled to effect the desired light characteristic. In one system, the one or more pulse width modulated drive signals comprises a plurality of pulse width modulated drive signals that are respectively supplied to the plurality of LEDs, so that the light intensities of the LEDs can be independently controlled to effect the desired light characteristic. If the LEDs are arranged into a plurality of unique color groupings, the plurality of pulse width modulated drive signals can be respectively supplied to the plurality of LED color groupings, so that the light intensities of the LED color groupings can be independently controlled to effect the desired light characteristic. In one system, the control circuitry may optionally comprise a pulse width modulation controller configured for generating pulse width modulated control signals, and drive circuitry configured for supplying pulse width modulated drive signals to the respective plurality of LED color groupings in response to the control signals.

Other and further aspects and features of the invention will be evident from reading the following detailed description of the preferred embodiments, which are intended to illustrate, not limit, the present inventions.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE ILLUSTRATED EMBODIMENTS

Figure 1:
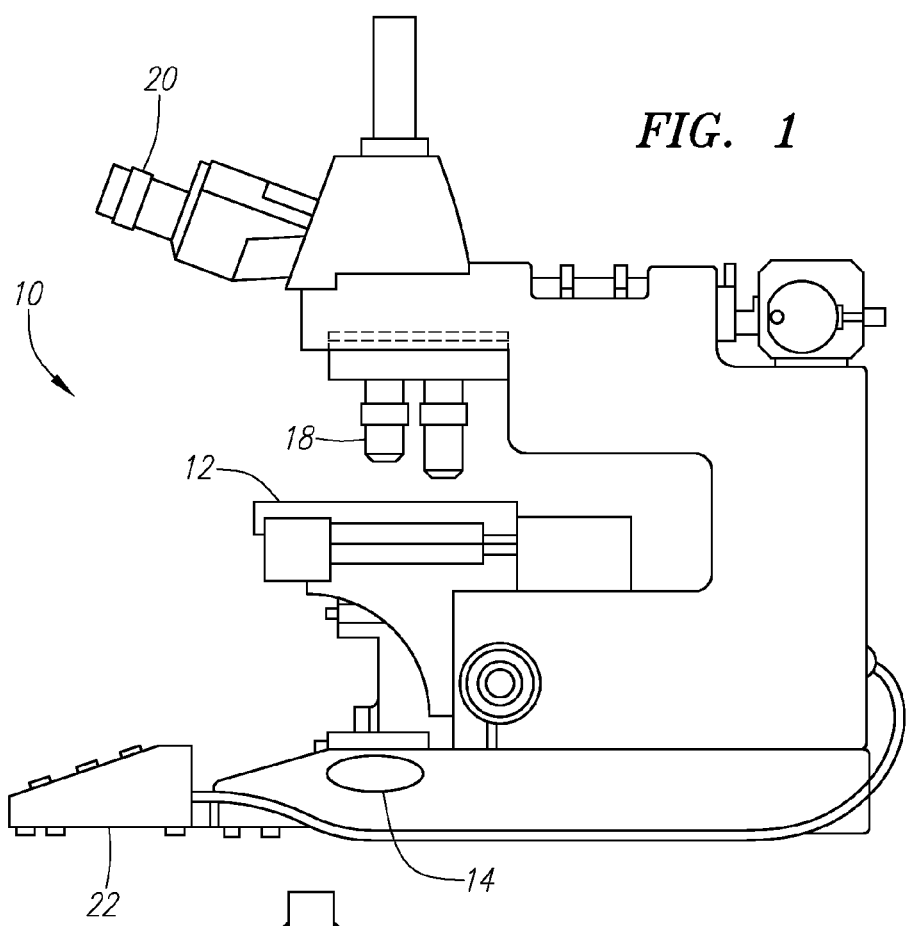
FIG. 1 is a side view showing a one embodiment of a microscope constructed in accordance with the present inventions.
Figure 2:
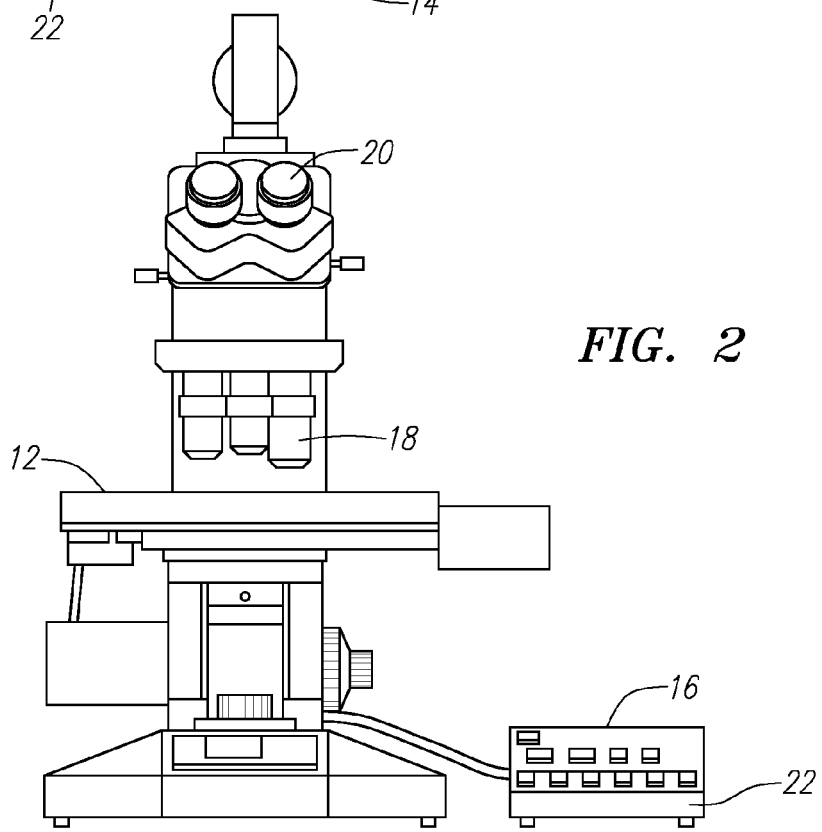
FIG. 2 is a front view of the microscope of FIG. 1.

Referring to FIGS. 1 and 2, a microscope 10 constructed in accordance with one embodiment of the present invention will now be described. The microscope 10 includes a stage 12 for mounting a specimen, and a light source 14 for illuminating the specimen. As will be described in further detail below, the color balance and intensity of the light emitted by the light source 14 can be adjusted. To this end, the microscope 10 further includes control circuitry 16 for adjusting the color balance and intensity of the emitted light. The microscope 10 further includes plurality of objective lenses 18 for magnifying light received from the specimen to form a magnified image of the specimen, and an ocular lens 20 used to observe the magnified image formed by the objective lens 18.

The microscope 10 further includes a control station 22 for receiving an input. Although the control station 22 is illustrated as a stand-alone control station, those skilled in the art will appreciate that the control station 22 can be implemented in a number of ways. For example, the control station 22 could be built into the same structure that carries the stage 12, light source 14, and lenses 18, 20. While the light source control circuitry 16 is shown in the illustrated embodiment as being incorporated into the control station 22, it can likewise be incorporated into the same structure that carries the stage 12, light source 14, and lenses 18, 20.

In one embodiment, the control station 22 receives a manual input from a user. In this case, the control station 22 may include appropriate user input devices, such as knobs, dials, buttons, keyboard, mouse, or the like. The control station 22 could be implemented in a computer or other user workstation, and could include a graphical user interface (GUI) for interfacing with a user. The user input may specify a desired color balance and intensity, in which case, the light source control circuitry 16 adjusts the color balance and intensity of the light source 14 to match the user-specified color and intensity. Or the user input may specify one or more specimen viewing conditions, such as, for example, the type of stain(s) used on the specimen, the type of cells in the specimen, the type of abnormalities/diseases to be detected, the ambient conditions in the laboratory, and the like. In this case, the light source control circuitry 16 computes a desired color balance and light intensity based on the viewing conditions (e.g., by referring to a look-up table), and adjusts the color balance and intensity of the light source 14 to match the computed color balance and intensity. Alternatively, the specimen viewing conditions may be automatically inputted. For example, the control station 22 may be equipped with a bar code reader or other reader configured to read information printed on a slide carrying the cytological specimen. The control station 22 may also be equipped with a sensor configured to measure the ambient lighting of the room.

However the input to the control station 22 is implemented, the color balance and intensity of the light emitted by the light source 14 will be dynamically adjusted to provide optimum viewing conditions for the specimen. For example, if a cytological specimen is provided, a cytologist may wish to view a sample that includes blue-stained nuclei in green-stained cytoplasm. In this case, the color balance may be adjusted to increase the amount of green light. Adjusting the color balance thusly would minimize the contrast between the cytoplasm and the background, allowing the cytologist to better view the nuclei. Similarly, the intensity of the light source may be adjusted to allow visualization of the structure within darkly stained nuclei, or within a tight and dense grouping of cells.

The nature of the information and manner of input will dictate how the light source control circuitry 16 is implemented. For example, if knobs, buttons, or dials are used, the control circuitry 16 may include one or more potentiometers or other appropriate circuit elements, which output analog drive signals to control the light source 14. If a GUI is used to specify a desired color balance and light intensity, the control circuitry 16 may include a digital/analog converter for converting digital signals representing the desired color balance and light intensity into analog signals to control the light source 14. If viewing conditions are input either manually or automatically, the control circuitry 16 may include a processor for computing a desired color balance and light intensity based on the viewing conditions. The nature of the light source control circuitry 16 will also depend on the nature of the light source 14 used, as described in further detail below.

The light source 14 advantageously includes a plurality of light emitting diodes (LEDs) of two or more color groups. In this manner, the intensities of the LEDs, or at least the collective intensity of each LED color grouping, may be independently controlled to adjust the color balance (i.e., tint) and intensity of the light provided to the biological specimen for viewing by a human or for imaging with a camera. In this manner, any color in the visible or even invisible spectrum, including white light, can be produced.

Figure 3A:
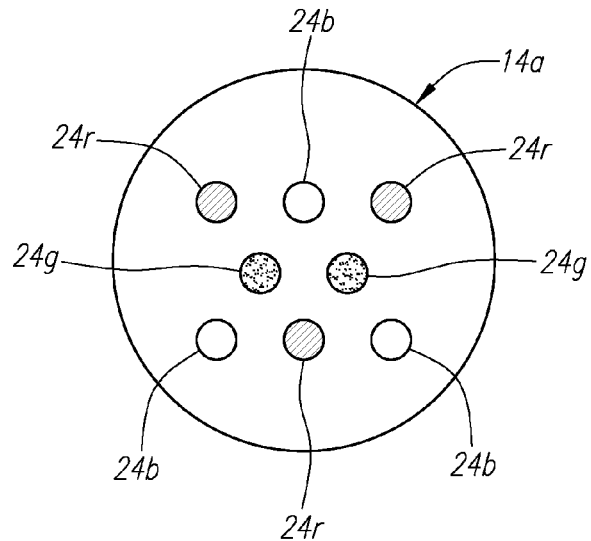
FIGS. 3A-3C are plan views of exemplary light emitting diode (LED) modules used as the illumination source in the microscope of FIG. 1.
Figure 3B:
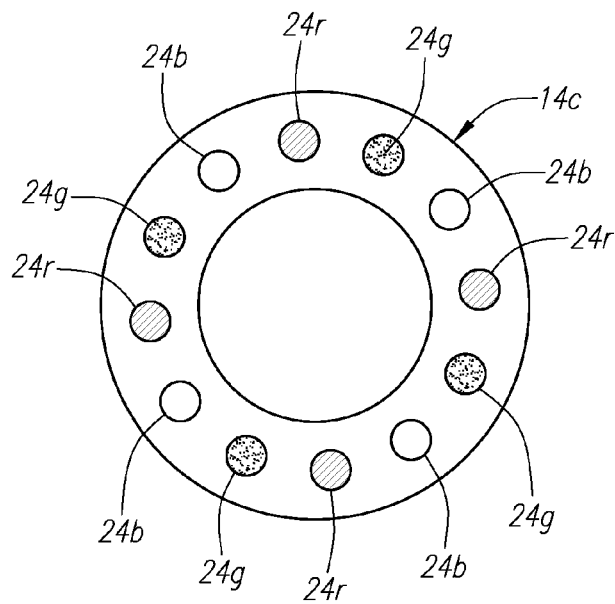
Figure 3C:
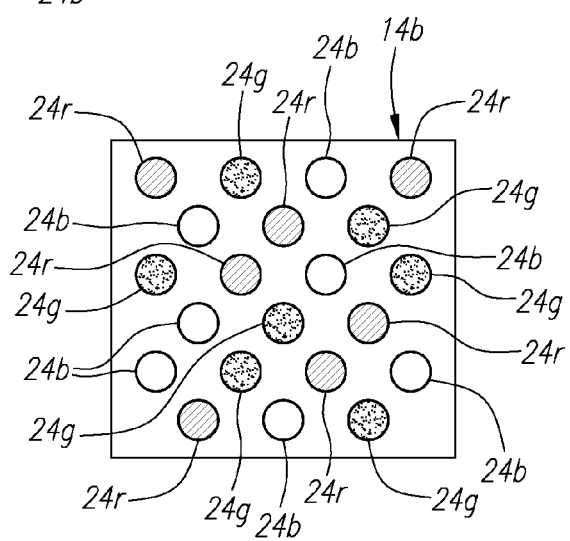

Referring now to FIGS. 3A-3C, several embodiments of the light source 14 (illustrated as 14a, 14b, and 14c), which has been implemented as an LED module, will be described. The LED module 14 includes a plurality of LEDs 24 (illustrated as 24r, 24b, 24g), which as made clear in FIGS. 3A-3C, can be arranged in a module that is circular, annular, rectangular, or some other shape, and may be distributed within the module in a staggered, rectilinear, annular, or other configuration.

In the embodiments illustrated in FIGS. 3A-3C, the LEDs 24 output three colors of light. For example, LEDs 24r may output red light; LEDs 24b may output blue light, and LEDs 24g may output green light. Alternatively, the LEDs 24 dies may output specific wavelengths that are selected for the stains used with the specimen. Furthermore, while the LED module 14 is illustrated in FIGS. 3A-3C as containing three color groupings, other numbers of color groupings may be used. In particular, it is contemplated that implementations of the invention could have two color groupings, or four or more color groupings.

The type of LEDs illustrated in FIGS. 3A-3C are preferably high-brightness LEDs, which may be implemented in a combination of single discrete LEDs or custom multi-chip LED modules. Under certain circumstances it is preferred that a custom multi-chip LED module, which has a relatively small aperture, be used. For example, conventional microscopes are often designed with a light-emitting filament that measures about 2 mm by 2 mm, a size that matches the aperture of a Koehler illumination lens system that receives light from the source for producing uniform illumination of the biological specimen. In order to make use of legacy systems and designs, it is advantageous that the light source used be on the order of a few millimeters in diameter. However, other implementations may include larger light sources, such as combinations of discrete LEDs.

In the case where a custom multi-chip LED is preferred, multiple LED dies may be integrated on a single substrate to produce a dense arrangement. Individual lenses can be placed above each die so that the radiation from each die is collected into a narrow cone. For example, a hexagonal pattern of lenses could be used. A substrate, such as one with high thermal conductivity, could be used to hold multiple LED dies. Conductive patterns on the substrate may be used to wire bond the dies to the substrate for electrical connections. This arrangement may be on the order of millimeters in diameter to allow the light source to be used with conventional systems and techniques.

However the LEDs 14 are implemented, the light source control circuitry 16 is configured to independently control the color groups of the LEDs in order to adjust the color balance and intensity of the light emitted by the module 14. In particular, the control circuitry 16 adjusts the relative intensities for each color of LEDs. For example, in the module 14 illustrated in FIG. 3A, it may be computed that the red LED dies are to operate at 25% of capacity, the green LED dies are to operate at 25% of capacity, and the blue LED dies are to operate at 35% of capacity. The control circuitry 16 then operates to control the LED dies at the calculated capacity. If necessary, the light source control circuitry 16 may include a processor (not shown) for computing the intensities of the LED groups based on the desired color balance and light intensity.

The control circuitry 16 may either provide analog drive signals or digital drive signals to the LEDs 24. If an analog modality is used, the control circuitry 16 may output a voltage and/or current level to each LED 24 or LED color group in order to control the intensity of the LEDs. That is, the greater the voltage and/or current level, the higher the intensity of the LED 14 or LED color group controlled. While an analog modality can be used, a digital modality provides a more efficient and cheaper way of controlling the LED module 14. For example, the control circuitry 16 may output a pulse width modulated square wave to each LED 14 or group of LEDs The pulse width for each LED will be dictated by the duty cycle for each LED color grouping necessary to effect the desired color balance and light intensity of the module 14. For example, if red, green, and blue LED color groupings are used, the red LEDs may be supplied with a pulse width modulated signal having a 25% duty cycle, the green LEDs may be supplied with a pulse width modulated signal having a 25% duty cycle, and the blue LEDs may be supplied with a pulse width modulated signal having a 35% duty cycle.

Figure 4:
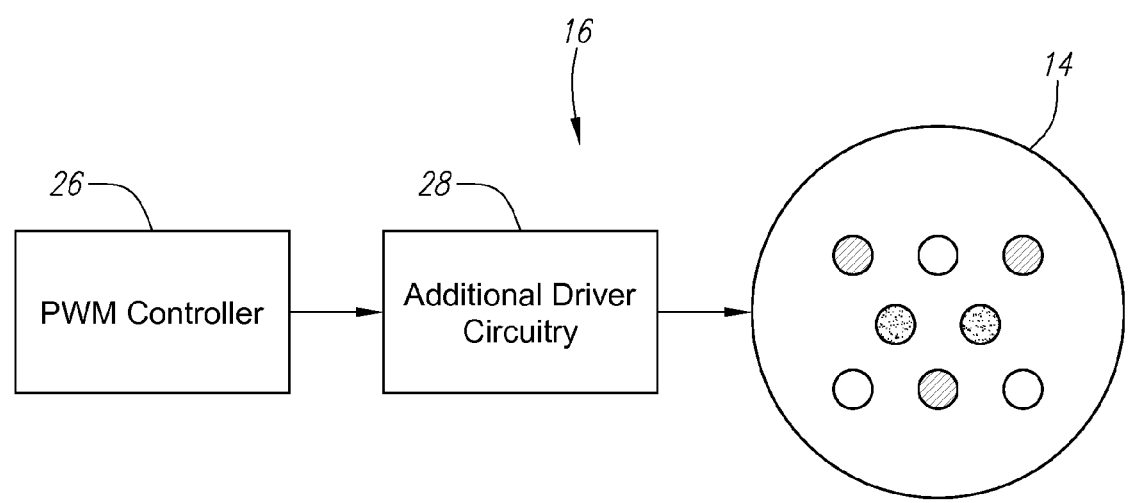
FIG. 4 is a block diagram of control circuitry used to control the LED module of FIG. 3A.

Referring to FIG. 4, an exemplary embodiment of digital light source control circuitry 16 will be described. The digital control circuitry 16 includes a pulse width modulation (PWM) controller 26, which generates a modulated control signal in response to inputted voltage levels. Such voltage signals can be input from a processor or digital to analog converter, as previously discussed. In response, the different colored groups of LEDs output light based on the signals from the PWM controller 26.

If the load requirements of the LED module 14 are within the output capacity of the PWM controller 26, the output signals from the PWM controller 26 may be used as drive signals to directly drive the LEDs 24. However, if the load requirements of the LED module 14 are greater than the output capacity of the PWM controller 26, the digital control circuitry 16 may also include additional driver circuitry 28. The additional driver circuitry 28 may be used, for example, to amplify the output control signals of the PWM controller 26, or to otherwise provide drive signals to the LEDs 24 based on the output signals of the PWM controller 26.

Figure 5:
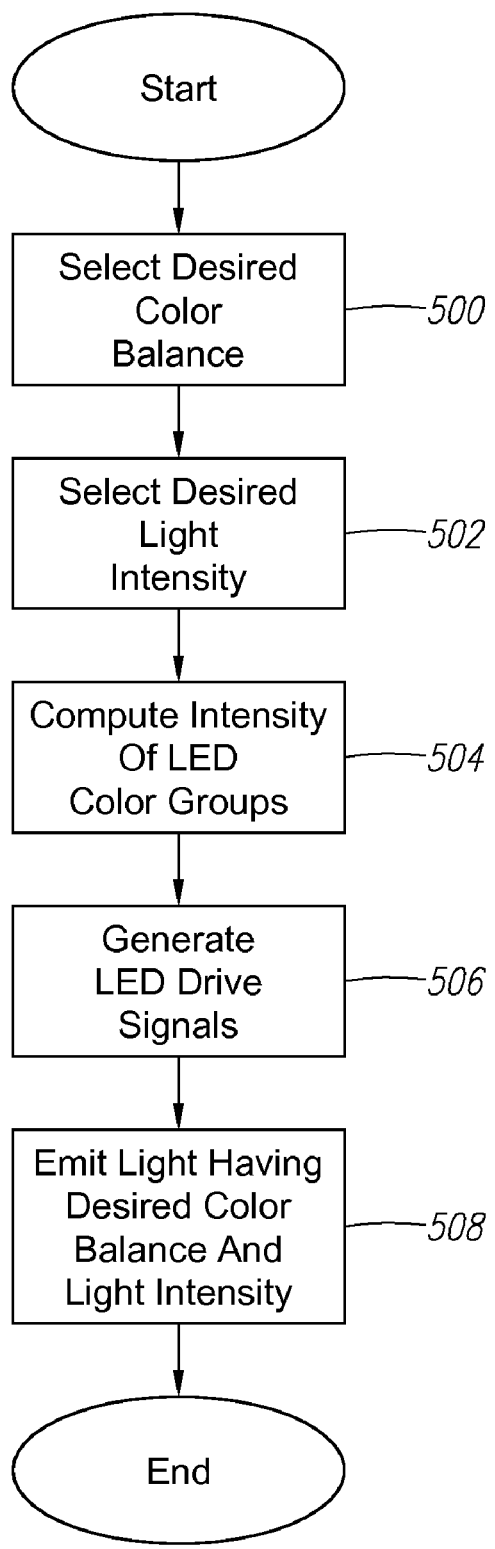
FIG. 5 is a flow chart illustrating one method for controlling the characteristics of light emitted by the illumination source of the microscope of FIG. 1 in accordance with the present inventions.

Referring now to FIG. 5, one method of controlling the light emitted by the LED module 14 will be described. In this method, the user selects the desired color balance (step 500) and desired light intensity (step 502). The desired light intensity and color balance may be selected, for example, using physical selection means such as knobs or dials, or may be selected, for example, via a computer using a graphical user interface (GUI). Based on the desired color balance and color intensity selected by the user, the light source control circuitry 16 computes the desired intensity of the LED color groups (step 504), and generates drive signals having a characteristic (i.e., the amplitude of the voltage and/or current in the case of an analog arrangement, or duty cycle in the case of a digital arrangement) that effects the computed intensity for each color grouping (step 506). In response to the drive signals, the LED module 14 then emits light with the desired color balance and intensity (step 508).

Figure 6:
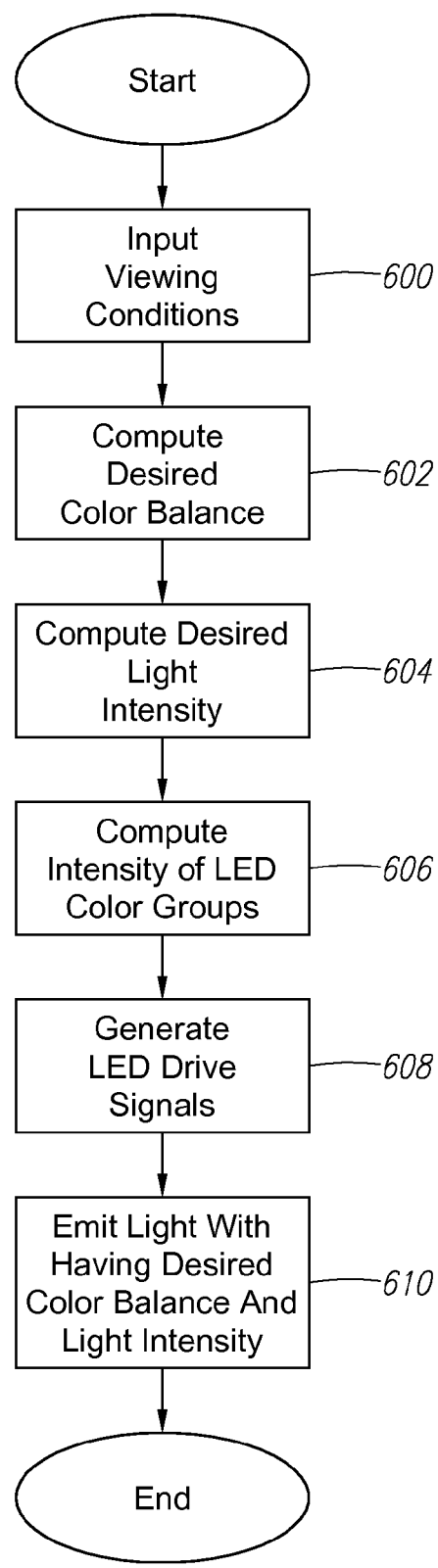
FIG. 6 is a flow chart illustrating one method for controlling the characteristics of light emitted by the illumination source of the microscope of FIG. 1 in accordance with the present inventions.

Referring to FIG. 6, another method of controlling the light emitted by the LED module 14 will be described. The method illustrated in FIG. 6 is similar to the method illustrated in FIG. 5, with the exception that the color balance and light intensity is not selected based on a user input, but rather the input of one or more specimen viewing conditions (step 600). As previously discussed, the viewing conditions may include, for example, the type of cells to be imaged, the type of stain(s) used, the ambient conditions of the room, and the like. The light source control circuitry 16 then computes the desired color balance (step 602) and computes the desired light intensity (step 604) based on the viewing conditions. Based on the computed color balance and color intensity, the light source control circuitry 16 computes the relative intensity of the LED color groups (step 606), generates drive signals having a characteristic that effects the computed relative intensity for each color grouping (step 608), and in response to the drive signals, the LED module 14 emits light with the selected color balance and intensity (step 610).

While the foregoing description has described separate methods for user control and electronic control, it is contemplated that combinations of user control and electronic control could be used. For example, default settings may be generated electronically, and a user may alter the settings during imaging of the specimen. As another example, default settings may be selected by a user, and the settings may be altered electronically based on detected conditions during viewing of the specimen. In addition, while the methods described have computed a single duty cycle for a group of LEDs and constantly provided a single drive signal to the LEDs, the drive signal could be altered during viewing, based on user selections or detected conditions.

Furthermore, while the microscope has been described as projecting an image to a cytologist or other human operator, it is contemplated that magnified images of a specimen could be transmitted to a camera or other input device, and the images could be analyzed via a computer and/or stored for later viewing by a cytologist. In such a system, the color balance and/or intensity could be electronically computed based not only on those conditions described above, but on other conditions as well. For example, the color balance and/or intensity could be adjusted in order to facilitate data compression of the stored images, in order to facilitate analysis by a computer program, or based on the type of imaging system used (for example, ultraviolet light could be used in conjunction with an ultraviolet camera and film). Other modifications will occur to those skilled in the art.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed is:

1. A method for viewing a biological specimen, comprising:
   illuminating the biological specimen with a light source having light emitting diodes (LEDs) arranged in a plurality of unique color groupings;
   generating a magnified image of the illuminated biological specimen;
   receiving an input to effect a desired light characteristic of light emitted by the light source;
   computing, by control circuitry, a respective light intensity for each of the LED color groupings based on the input;
   generating a plurality of drive signals, each of which has a drive signal characteristic based on the computed light intensity for a corresponding one of the LED color groupings; and
   supplying the plurality of LED color groupings with the respective plurality of drive signals, wherein light intensities of the LED color groupings are independently controlled to effect the desired light characteristic.

2. The method of claim 1, wherein the LEDs comprise LED dies disposed on a single substrate.

3. The method of claim 1, wherein the desired light characteristic comprises a color balance.

4. The method of claim 3, wherein the desired light characteristic further comprises a light intensity.

5. The method of claim 1, wherein the input is a manual input.

6. The method of claim 1, wherein the input is an automated input.

7. The method of claim 1, wherein the input is based on a viewing condition of the biological specimen.

8. The method of claim 7, wherein the viewing condition is a type of stain used on the biological specimen.

9. The method of claim 1, wherein the drive signal characteristic is an amplitude.

10. The method of claim 1, wherein the drive signal characteristic is a pulse width.

11. A system for viewing a biological specimen, comprising:
    a microscope configured for generating a magnified image of the biological specimen;
    a light source configured for illuminating the biological specimen, the light source having light emitting diodes (LEDs) arranged in a plurality of unique color groupings;
    an input device configured for receiving information to effect a desired characteristic of light emitted by the light source; and
    control circuitry configured for supplying the plurality of LED color groupings with a respective plurality of drive signals, each of which has a characteristic based on the information received by the input device, wherein light intensities of the LED color groupings are independently controlled to effect the desired light characteristic.

12. The system of claim 11, wherein the LEDs comprise LED dies disposed on a single substrate.

13. The system of claim 11, wherein the desired light characteristic comprises a color balance.

14. The system of claim 13, wherein the desired light characteristic further comprises a light intensity.

15. The system of claim 11, wherein the input device comprises a user input device configured for selecting the desired light characteristic.

16. The system of claim 11, further comprising a processor configured for computing the desired light characteristic.

17. The system of claim 16, wherein the processor is configured for computing the desired light characteristic based on a viewing condition.

18. The system of claim 17, wherein the viewing condition is a type of stain used on the biological specimen.

19. The system of claim 11, wherein the drive signal characteristic is an amplitude.

20. The system of claim 11, wherein the drive signal characteristic is a pulse width.

21. The system of claim 20, wherein the control circuitry includes a pulse width modulation controller configured for generating pulse width modulated control signals.

22. The system of claim 21, wherein the control circuitry further includes drive circuitry configured for supplying pulse width modulated drive signals to the respective plurality of LED color groupings in response to the control signals.

23. A method for viewing a biological specimen, comprising:
    illuminating the biological specimen with a light source having light emitting diodes (LEDs);
    generating a magnified image of the illuminated biological specimen;
    receiving an input to effect a desired light characteristic of light emitted by the light source;
    computing, by control circuitry, a respective light intensity for each of the LEDs based on the input;
    generating one or more pulse width modulated drive signals, each of which has a pulse width based on the computed light intensity for a corresponding one of the LEDs; and
    supplying the LEDs with the one or more pulse width modulated drive signals, wherein light intensities of the LEDs are controlled to effect the desired light characteristic.

24. The method of claim 23, wherein the LEDs comprise LED dies disposed on a single substrate.

25. The method of claim 23, wherein the desired light characteristic comprises a color balance.

26. The method of claim 23, wherein the desired light characteristic comprises a light intensity.

27. The method of claim 23, wherein the input is a manual input.

28. The method of claim 23, wherein the input is an automated input.

29. The method of claim 23, wherein the input is based on a viewing condition of the biological specimen.

30. The method of claim 29, wherein the viewing condition is a type of stain used on the biological specimen.

31. The method of claim 23, wherein the one or more pulse width modulated drive signals comprises a plurality of pulse width modulated drive signals that are respectively supplied to the LEDs, wherein the light intensities of the LEDs are independently controlled to effect the desired light characteristic.

32. The method of claim 23, wherein the LEDs are arranged into a plurality of unique color groupings, and the one or more pulse width modulated drive signals comprises a plurality of pulse width modulated drive signals that are respectively supplied to the plurality of LED color groupings, wherein light intensities of the LED color groupings are independently controlled to effect the desired light characteristic.

33. The method of claim 23, further comprising computing the pulse width for each pulse width modulated drive signal.

34. A system for viewing a biological specimen, comprising:
   a microscope configured for generating a magnified image of the biological specimen;
   a light source configured for illuminating the biological specimen, the light source having light emitting diodes (LEDs);
   an input device configured for dynamically receiving information to effect a desired characteristic of light emitted by the light source; and
   control circuitry configured for supplying the LEDs with one or more pulse width modulated drive signals, each of which has a characteristic based on the information received by the input device, wherein light intensities of the LEDs are controlled to effect the desired light characteristic.

35. The system of claim 34, wherein the LEDs comprise LED dies disposed on a single substrate.

36. The system of claim 34, wherein the desired light characteristic comprises a color balance.

37. The system of claim 36, wherein the desired light characteristic further comprises a light intensity.

38. The system of claim 34, wherein the input device comprises a user input device configured for selecting the desired light characteristic.

39. The system of claim 34, further comprising a processor configured for computing the desired light characteristic.

40. The system of claim 39, wherein the processor is configured for computing the desired light characteristic based on a viewing condition.

41. The system of claim 40, wherein the viewing condition is a type of stain used on the biological specimen.

42. The system of claim 34, wherein the one or more pulse width modulated drive signals comprises a plurality of pulse width modulated drive signals that are respectively supplied to the LEDs, wherein the light intensities of the LEDs are independently controlled to effect the desired light characteristic.

43. The system of claim 34, wherein the LEDs are arranged into a plurality of unique color groupings, and the one or more pulse width modulated drive signals comprises a plurality of pulse width modulated drive signals that are respectively supplied to the plurality of LED color groupings, wherein light intensities of the LED color groupings are independently controlled to effect the desired light characteristic.

44. The system of claim 34, wherein the control circuitry includes a pulse width modulation controller configured for generating pulse width modulated control signals.

45. The system of claim 44, wherein the control circuitry further includes drive circuitry configured for supplying the pulse width modulated drive signals to the LEDs, in response to the control signals.

* * * * *

UNITED STATES PATENT AND TRADEMARK OFFICE
CERTIFICATE OF CORRECTION

PATENT NO. : 7,433,026 B2
APPLICATION NO. : 11/313365
DATED : October 7, 2008
INVENTOR(S) : Scott Wolpert and David J. Zahniser It is certified that error appears in the above-identified patent and that said Letters Patent is hereby corrected as shown below:

Column 1, line 3, please insert:

--GOVERNMENT RIGHTS

This invention was made with U.S. Government support under NIH Grant No. RR018046. The U.S. Government may have certain rights in this invention.--

Signed and Sealed this

Twenty-first Day of April, 2009

JOHN DOLL
*Acting Director of the United States Patent and Trademark Office*